United States Patent
Marent et al.

(10) Patent No.: US 10,404,158 B2
(45) Date of Patent: Sep. 3, 2019

(54) POWER FACTOR CORRECTION (PFC) MODULE OPERATING IN DISCONTINUOUS CURRENT MODE (DCM), SYSTEM CONTAINING THE PFC MODULE AND METHODS OF OPERATING THEREFOR

(71) Applicant: Tridonic GmbH & Co KG, Dornbirn (AT)

(72) Inventors: Günter Marent, Bartholomäberg (AT); Thomas Ondrisek, Vienna (AT)

(73) Assignee: Tridonic GmbH & Co KG, Dornbirn (AT)

( * ) Notice: Subject to any disclaimer, the term of this patent is extended or adjusted under 35 U.S.C. 154(b) by 0 days.

(21) Appl. No.: 15/759,592

(22) PCT Filed: Sep. 12, 2016

(86) PCT No.: PCT/EP2016/071473
§ 371 (c)(1),
(2) Date: Mar. 13, 2018

(87) PCT Pub. No.: WO2017/046039
PCT Pub. Date: Mar. 23, 2017

(65) Prior Publication Data
US 2018/0262102 A1    Sep. 13, 2018

(30) Foreign Application Priority Data

Sep. 15, 2015  (DE) .................. 10 2015 217 629

(51) Int. Cl.
*H05B 37/02*   (2006.01)
*H02M 1/42*    (2007.01)
(Continued)

(52) U.S. Cl.
CPC ......... *H02M 1/4225* (2013.01); *H02M 3/157* (2013.01); *H05B 33/0815* (2013.01);
(Continued)

(58) Field of Classification Search
CPC .................. H05B 33/0815; H02M 1/4208
See application file for complete search history.

(56) References Cited

U.S. PATENT DOCUMENTS 5,777,866  A    7/1998  Jacobs et al.
7,279,876  B2 * 10/2007  Adragna .................. G05F 1/70
                                                            323/284
(Continued)

FOREIGN PATENT DOCUMENTS

DE          40 13 477 A1    10/1991

OTHER PUBLICATIONS

Ye Z Z et al: Digital implementation of a unity-power-factor constant-frequency DCM boost converter II , APPLI ED Power Electronics Conference and Exposition, 2005. APEC 2005. Twenti ETH Annual IEEE Austi N, TX, USA Mar. 6-10, 2005, Piscataway, NJ, USA,IEEE, US, vol. 2, Mar. 6, 2005 (Mar. 6, 2005), pp. 818-824vol.2, XPO10809330, DOI: 10.1109/APEC.2005.1453074 ISBN: 978-0/7803-8975-5.

(Continued)

*Primary Examiner* — Thuy V Tran
(74) *Attorney, Agent, or Firm* — The H.T. Than Law Group

(57) ABSTRACT

A PFC module is disclosed and contains an actively clocked PFC circuit (104) comprising at least one controlled switch (S1), and an integrated circuit (103) as a control unit which controls during a half-wave of the input voltage($V_{in}$)of the actively clocked PFC circuit (104) the at least one switch (S1) of the actively clocked PFC circuit (104) with a fixed operating frequency in discontinuous current mode(DCM) The integrated circuit (103) sets the switch-on time ($t_{on}$) of the at least, one switch (S1)dependent on the amplitude of the input voltage ($V_{IN}$) of the actively clocked. PFC circuit (104), and keeps constant the switch-on time ($t_{on}$) for at least two consecutive switching cycles within the half-wave of the input voltage ($V_{IN}$), Also disclosed are a system containing the PFC module and a method for operating the PFC module.

20 Claims, 6 Drawing Sheets

(51) Int. Cl.
  *H02M 3/157*   (2006.01)
  *H05B 33/08*   (2006.01)
  *H02M 1/00*   (2006.01)
  *H02M 3/156*   (2006.01)
  *H02M 3/335*   (2006.01)

(52) U.S. Cl.
  CPC .......... *H02M 1/4208* (2013.01); *H02M 3/156* (2013.01); *H02M 3/33523* (2013.01); *H02M 2001/007* (2013.01); *H02M 2001/0012* (2013.01); *Y02B 70/126* (2013.01)

(56)     References Cited

U.S. PATENT DOCUMENTS

| | | | |
|---|---|---|---|
| 7,295,452 B1 | 11/2007 | Liu | |
| 9,166,470 B2 | 10/2015 | Kelly | |
| 9,510,401 B1* | 11/2016 | Kost | H02M 1/4225 |
| 2009/0141524 A1 | 6/2009 | Fagnani et al. | |
| 2013/0057170 A1* | 3/2013 | Altheimer | H02M 1/4208 |
| | | | 315/200 R |

OTHER PUBLICATIONS

International Search Report issued in connection with the corresponding International Application No. PCT/EP2016/071473 dated Feb. 6, 2017.

English translation of DE 40 13 477 to Philips Patentverwaltung.

* cited by examiner

POWER FACTOR CORRECTION (PFC) MODULE OPERATING IN DISCONTINUOUS CURRENT MODE (DCM), SYSTEM CONTAINING THE PFC MODULE AND METHODS OF OPERATING THEREFOR

FIELD OF THE INVENTION

The present invention relates to a PFC module comprising an actively clocked PFC circuit and a control unit which is controlling the actively clocked PFC circuit in discontinuous conduction mode, a system with an intelligent PFC module of said type and at least one converter stage for the operation, for example, of an LED array, lighting devices with an PFC module of said type, and a system and method for the operation of a PFC module and system of said type.

BACKGROUND AND OBJECTIVE OF THE INVENTION

From the State of the Art, actively clocked PFC circuits (Power Factor Control Circuits and/or Power Factor Correction Circuits) with at least one actively clocked switch and the management system and/or control system of PFC circuits of said type by a control unit are already known.

Circuits of said type serve in control gears for light sources, such as, for example, an LED array comprising one or more LEDs, to transform a d.c. voltage or an a.c. voltage supplied to a specific voltage level. At the same time, actively clocked PFC circuits are being used in order to present a consumer with a power factor of almost 1, if an a.c. voltage, such as, for example, a mains a.c. voltage is supplied to the PFC circuit.

In order to achieve this, the actively clocked PFC circuit, in particular the at least one switch of the actively clocked PFC circuit, is managed and/or controlled in such a manner by the control unit that the current consumed precisely like the a.c. voltage comprises a sinusoidal variation in time. As a result, harmonic currents in the supply network can be reduced which would occur in the case of a variation in time, which is not sinusoidal, of the current consumed by the PFC circuit. This means that the control unit is controlling and/or is clocking the at least one switch of the actively clocked PFC circuit in such a way that the current consumed by the PFC circuit is adjusted to a sinusoidal envelope curve in order that the current exhibits a sinusoidal variation in time in accordance with the sinusoidal variation in time of the a.c. voltage with which the PFC circuit is supplied.

There are various known modes of operation in which the control unit can operate a PFC circuit, such as, for example, the continuous current mode (CCM), the discontinuous current mode (DCM) and the borderline mode.

Typical of the borderline mode is the fact that the at least one switch of the actively clocked PFC circuit is switched on when the current through the coil of the actively clocked PFC circuit is dropping to zero amperes (0 A). This has the disadvantage that the zero crossing of the current through the coil must be measured and must be supplied to the control unit. Contrary to this, in discontinuous current mode (DCM), the at least one switch is controlled with a fixed frequency, this means that it is switched on after a fixed period of time and/or after a fixed time span, wherein for each switching cycle a dead time exists during which no current is flowing through the coil.

The State of the Art with respect to actively clocked PFC circuits and a power factor correction with circuits of said type can, for example, be taken from the following publications:

the U.S. Pat. No. 5,777,866,
the US Patent Application US 2009/0141524 A1, as well as
the international Patent Applications WO 2011/009717 A2 and WO 2007/121944 A2.

PFC circuits form in control gears for light sources such as, for example, LEDs, often only a first converter stage. As a result, often at least one further converter stage for the operation of the light sources is connected to a PFC circuit which is supplied with the output voltage $V_{BUS}$ of the PFC circuit. This at least one converter stage then constitutes a constant current source or a constant voltage source which, in the case of an LED load, generates the corresponding LED current or the corresponding voltage for the operation of the LED load. The at least one converter stage can be an actively clocked current source and/or a linear current source which is controlled by an own control unit.

In order to guarantee an operation of the PFC circuit and of the at least one converter stage adjusted to modified input voltage conditions and/or load conditions, the control units of these two circuits must be coordinated with each other.

Now, it is the objective of the present invention, to provide an intelligent PFC module, which comprises an actively clocked PFC circuit, and an integrated circuit as a control unit, wherein the actively clocked PFC circuit is being operated and/or being controlled by the integrated circuit in discontinuous current mode (DCM). Moreover, it is the objective of the present invention, to provide a system comprising an intelligent PFC module of said type and at least one further converter stage connected to the PFC circuit of the PFC module for the operation of an LED array, with one or more LEDs, wherein the at least one converter stage is likewise controlled by the integrated circuit and/or by the integrated control circuit of the PFC module.

This objective is achieved in accordance with the invention by the features of the independent patent claims. The dependent patent claims develop further the central idea of the invention in a particularly advantageous manner.

DESCRIPTION OF THE INVENTION

In accordance with a first aspect of the present invention, a PFC module is provided with
an actively clocked PFC circuit comprising at least one controlled switch, and
an integrated circuit, preferably a microcontroller as a control unit which is controlling the at least one switch of the actively clocked PFC circuit with a fixed operating frequency in discontinuous current mode (DCM), wherein the integrated control circuit sets the switch-on time ($t_{on}$) of the at least one switch dependent on the amplitude of the input voltage of the actively clocked PFC circuit, and keeps constant the switch-on time ($t_{on}$) for at least two consecutive switching cycles within a half-wave of the input voltage.

Moreover, in accordance with the invention, the integrated circuit can set the switch-on time ($t_{on}$) of the at least one switch dependent on the output voltage of the actively clocked PFC circuit in order that the actual value of the output voltage of the PFC circuit corresponds to a set value.

Moreover, in accordance with the invention, the integrated control circuit can comprise at least one input pin, wherein the integrated control circuit can detect via the at least one input pin the input voltage and the output voltage of the PFC circuit.

Moreover, in accordance with the invention, the integrated control circuit can comprise at least two input pins, wherein the integrated control circuit via the first of the at least two input pins can detect the input voltage of the PFC circuit, and via the second of the at least two input pins can detect the output voltage of the PFC circuit.

Moreover, in accordance with the invention, it can be possible to connect directly or indirectly a load circuit comprising an LED array with one or more LEDs to the actively clocked PFC circuit, wherein it can be possible that the integrated circuit is adapted in order to control the actively clocked PFC circuit and/or the load circuit on the basis of at least one feedback variable from the load circuit.

Moreover, in accordance with the invention, the integrated circuit can be adapted in order to change the operating frequency of the PFC circuit with a frequency below the frequency of a half-wave of the input voltage of the PFC circuit as an adjustment to changed input voltage conditions and/or to changed load conditions.

Furthermore, in accordance with the invention, the input voltage of the actively clocked PFC circuit can be a rectified a.c. voltage, preferably a mains voltage.

In accordance with the invention, the above mentioned optional features can be used in any combination whatsoever in order to produce the PFC module in accordance with the invention.

In accordance with to a second aspect of the present invention, a system is provided with a PFC module, preferably a PFC module in accordance with the invention, as it has been described above, comprising an actively clocked PFC circuit with at least a first switch and an integrated circuit, preferably a microcontroller. The system in accordance with the invention further comprises at least a converter stage with at least a second switch for the operation of an LED array with one or more LEDs, wherein the at least one converter stage is being connected directly or indirectly to the PFC circuit. In the system in accordance with the invention, the integrated circuit is controlling the at least one first switch of the actively clocked PFC circuit in discontinuous current mode (DCM), wherein the integrated circuit is controlling the actively clocked PFC circuit and the at least one converter stage dependent on the input voltage conditions and/or dependent on the load conditions, and the integrated circuit is controlling the at least one second switch of the at least one converter stage for the setting of the light output which is being emitted by the LED array.

Furthermore, in the system in accordance with the invention, the integrated control circuit can control groups of clocked electrical components and/or groups of unclocked electrical components of the at least one converter stage.

Furthermore, in the system in accordance with the invention, the at least one converter stage can constitute a clocked current source for the operation of the LED array or an unclocked current source for the operation of the LED array.

Moreover, in the system in accordance with the invention, the integrated control circuit can detect at least a first feedback variable from the at least one converter stage and/or at least a second feedback variable from the LED array which can be operated by the at least one converter stage.

Furthermore, in the system in accordance with the invention, the integrated control circuit can control the actively clocked PFC circuit, preferably the operating frequency of the actively clocked PFC circuit, and the at least one converter stage dependent on the input voltage of the actively clocked PFC circuit, the at least one first feedback variable and/or the at least one second feedback variable.

Moreover, in the system in accordance with the invention, the output voltage can correspond to the actively clocked PFC circuit of the input voltage of the at least one converter stage, wherein the integrated control circuit can control the output voltage of the actively clocked PFC circuit dependent on the input voltage of the actively clocked PFC circuit, the at least one first feedback variable and/or the at least one second feedback variable.

Furthermore, in the system in accordance with the invention, the integrated control circuit can change the operating frequency of the PFC circuit with a frequency below the frequency of a half-wave of the input voltage of the actively clocked PFC circuit dependent on the input voltage of the actively clocked PFC circuit, the at least one first feedback variable and/or the at least one second feedback variable.

In accordance with the invention, the above mentioned optional features can be used in any combination whatsoever in order to result in the system in accordance with the invention.

In accordance with a third aspect of the present invention, a lighting device is provided with a PFC module in accordance with the invention, as it has been described above, and an LED array comprising at least one LED, wherein the PFC module is adapted in order to operate the LED array.

In accordance with a fourth aspect of the present invention, a lighting device is provided with a system in accordance with the invention, as it has been described above, and an LED array comprising at least one LED, wherein the system is adapted in order to operate the LED array.

In accordance with a fifth aspect of the present invention, a method for the operation of a PFC module is provided, wherein the PFC module comprises an actively clocked PFC circuit comprising at least one controlled switch, and an integrated circuit, preferably a microcontroller, as a control unit. In accordance with the method of the invention, the integrated circuit is controlling the at least one switch of the actively clocked PFC circuit with a fixed operating frequency in discontinuous current mode (DCM), wherein the integrated control circuit sets the switch-on time ($t_{on}$) of the at least one switch dependent on the amplitude of the input voltage of the actively clocked PFC circuit, and keeps the switch-on time ($t_{on}$) constant for at least two consecutive switching cycles within a half-wave of the input voltage.

In accordance with a sixth aspect of the present invention, a method for the operation of a system is provided, wherein the system comprises
  a PFC module, preferably a PFC module in accordance with the invention, as it has been described above, comprising an actively clocked PFC circuit with at least one first switch and an integrated circuit, preferably a microcontroller, and
  at least a converter stage with at least a second switch for the operation of an LED array with one or more LEDs.

The at least one converter stage is connected directly or indirectly to the PFC circuit. In the system in accordance with the invention, the integrated circuit is controlling the at least one first switch of the actively clocked PFC circuit in discontinuous current mode (DCM), wherein the integrated circuit is controlling the actively clocked PFC circuit and the at least one converter stage dependent on the input voltage conditions and/or dependent on the load conditions, and wherein the integrated circuit is controlling the at least one second switch of the at least one converter stage for the setting of the light output which is being emitted by the LED array.

BRIEF DESCRIPTION OF THE FIGURES

Further advantages, features and properties of the present invention will now be explained more in detail with reference to the figures of the accompanying drawing.

DETAILED DESCRIPTION OF THE FIGURES

Figure 1:
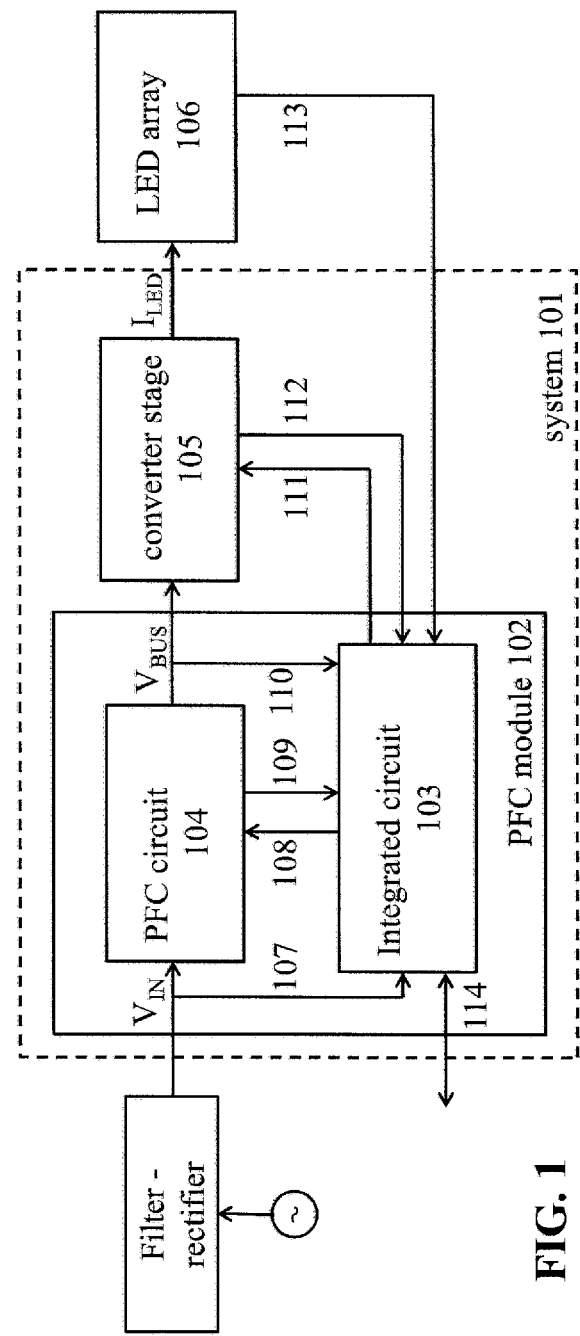
FIG. 1 shows here in a schematic view a preferred embodiment of the system in accordance with the invention, wherein the system comprises the PFC module in accordance with the invention with the actively clocked PFC circuit and the integrated control circuit as well as the at least one converter stage for the operation of an LED array.

FIG. 1 shows a schematic view of a preferred embodiment of the system 101 in accordance with the invention. The system 101 comprises a PFC module 102 and at least one converter stage 105 for the operation of an LED array 106. In accordance with FIG. 1, the LED array 106 is not a component part of the system 101. In accordance with the invention, the LED array 106, however, may also be a component part of the system 101.

The system 101 may also correspond to a control gear for the operation of an LED array 106. Furthermore, the PFC module 102 can constitute a lighting device together with the LED array 106 or the system 101 can constitute a lighting device together with the LED array 106.

The PFC module 102 comprises an actively clocked PFC circuit 104 and an integrated circuit 103 as a control circuit for the actively clocked PFC circuit 104.

The integrated circuit 103 can be any integrated circuit whatsoever and/or any control circuit whatsoever, which is known to the person skilled in the art, and which can be used for the controlling and/or the operation of an actively clocked PFC circuit. In accordance with the invention, the integrated circuit 103 is preferably a microcontroller.

The actively clocked PFC circuit 104 comprises at least a switch and can be, for example, a boost PFC circuit, that means a PFC circuit, which comprises a boost converter, or a buck PFC circuit, that means a PFC circuit, which comprises a buck converter. In accordance with the invention, the PFC circuit 104, however, can be any actively clocked PFC circuit whatsoever which is known to the person skilled in the art.

In accordance with FIG. 1, a rectified a.c. voltage, preferably a rectified mains voltage/mains a.c. voltage is supplied to the PFC circuit 104 as an input voltage $V_{IN}$. The a.c. voltage can be filtered and/or can be smoothed. In accordance with the invention, however, also a direct voltage can be supplied to the PFC circuit. Thus, the input voltage $V_{IN}$ of the actively clocked PFC circuit is corresponding to a rectified and preferably a filtered a.c. voltage, such as, for example, to a mains voltage or to a direct voltage.

In accordance with the invention, the rectifying and the filtering of the voltage supplied to the PFC circuit 104 can be made in any manner whatsoever, which is known to the person skilled in the art, in order to result in the input voltage $V_{IN}$. For example, the rectification can be made by means of a bridge rectification circuit, which comprises four diodes, and the filtering can be made by means of an EMI filter or by means of a low pass filter.

In accordance with FIG. 1, the elements for the rectification and the filtering are not a component part of the system 101. But in accordance with the invention, the elements for the rectification and the elements for the filtering can also be a component part of the system 101, of the PFC module 102 and/or of the actively clocked PFC circuit 104. In addition to a possible filtering outside the system 101, further elements for the filtering in the PFC module 102 and/or in the PFC circuit 104 can be provided.

The output voltage $V_{BUS}$ of the PFC circuit 104 is corresponding preferably to a direct voltage, which, depending on what kind of actively clocked PFC circuit 104 is being used, comprises a higher and/or a lower voltage level compared with the input voltage $V_{IN}$. In particular, the output voltage $V_{BUS}$ is being set by the clocking of the at least one switch of the PFC circuit 104.

In accordance with the invention, the integrated circuit 103 is controlling and/or operating—at unchanged marginal conditions, such as, for example, input voltage, load etc.— the actively clocked PFC circuit 104 in discontinuous current mode (DCM) with a fixed frequency and/or operating frequency. This means that the integrated circuit is clocking and/or operating the at least one switch of the actively clocked PFC circuit 104 in discontinuous current mode (DCM) at a fixed operating frequency.

For this purpose, the integrated control circuit 103 is supplying a signal and/or a clock signal 108 to the PFC circuit 104 for clocking of the at least one switch of the PFC circuit 104.

This signal 108 is determined and/or is calculated in the integrated circuit 103 on the basis of the input voltage $V_{IN}$ and preferably the output voltage $V_{BUS}$. The determination of the signal 108 for the clocking of the at least one switch of the PFC circuit 104 can be made in any manner whatsoever which is known to the person skilled in the art.

For this purpose, a feedback variable and/or a signal 107, which is reproducing the input voltage $V_{IN}$ of the PFC circuit 104 and a feedback variable and/or a signal 110, which is reproducing the output voltage $V_{BUS}$ of the PFC circuit 104 are being supplied to the integrated circuit 103.

The measurement of the input voltage $V_{IN}$ and of the output voltage $V_{BUS}$ and/or the generation of the corresponding feedback variables 107 and 110 as well as the supply of the feedback variables 107 and 110 to the integrated circuit 103 can be made in accordance with the invention in any manner whatsoever which is known to the person skilled in the art. This measurement and/or this generation can be made not only outside the PFC circuit 104 but also inside the PFC circuit 104.

Furthermore, in accordance with the invention, the input voltage $V_{IN}$ and the output voltage $V_{BUS}$ can be supplied to the integrated circuit 103 by means of an individual feedback variable. Optionally, still at least one other feedback variable 109 can be supplied to the integrated circuit 103. For example, the at least one other feedback variable 109 can reproduce the current by the at least one switch of the PFC circuit 104 in order to be able to detect an overcurrent.

In accordance with FIG. 1, the system 101 comprises a converter stage 105 to which the output voltage $V_{BUS}$ is supplied from the PFC circuit 104, wherein the converter stage is generating the current and/or the LED current $I_{LED}$ for the operation of the LED array 106. But in accordance with the invention, the system 101 can also comprise more than one converter stage, and the converter stage 105 can directly or indirectly, this means by means of at least one other converter stage, receive the output voltage $V_{BUS}$ from the PFC circuit 104 of the PFC module 102 and supply directly or indirectly the LED current $I_{LED}$ to the LED array 106.

In accordance with the invention, the at least one converter stage 105 of the system 101 is constituting a current source. The converter stage 105 can be a clocked or an unclocked current source. Furthermore, the converter stage 105 can comprise not only clocked assembly groups but also unclocked assembly groups.

For example, the at least one converter stage 105 can be a primarily clocked converter and/or transformer such as, for example, a buck converter or a boost converter, or a secondarily clocked converter and/or transformer, such as, for example, a flyback converter, a forward converter or a resonant converter.

The at least one converter stage 105, however, can also be a linear current source such as, for example, a linear controller realized with switches, preferably transistors, or integrated circuits.

In accordance with the invention, the at least one converter stage 105 of the system 101 can be any circuit whatsoever, which is known to the person skilled in the art, and which can generate from the output voltage $V_{BUS}$ of the PFC circuit 104 an LED current for the operation of an LED array 106.

Furthermore, in accordance with the invention, the converter stage 105 comprises at least one switch or an actuator the position of which has an influence on the LED current $I_{LED}$ and/or the electrical energy for the operation of the LED array 106.

As it is shown in FIG. 1, in accordance with the invention, the converter stage 105 is being controlled and/or is being operated by the integrated control circuit 103 of the PFC module 103. This means that the integrated circuit 103 is controlling the at least one switch of the converter stage 105 in order to set the LED current and/or the electrical energy by means of which the LED array 106 is supposed to be operated. Preferably, the integrated circuit 103 can be used for the setting and/or for the control of clocked assembly groups and of unclocked assembly groups in the converter stage 105.

Thus, the integrated circuit 103 is supplying at least one signal 111 to the converter stage 105 in order to set and/or control the current $I_{LED}$ and/or the electrical energy which is being supplied to the LED array 106. For this purpose, in accordance with the invention, at least a feedback variable and/or a signal 112 from the converter stage 105 and/or at least a feedback variable and/or a signal 113 from the LED array 106 are being supplied to the integrated circuit 103. These feedback variables 112 and 113 are representing information with respect to the converter stage 105 and with respect to the load, this means with respect to the LED array 106.

For example, the at least one feedback variable 112 and the at least one feedback variable 113 can reproduce the LED current, the LED voltage, the temperature of the LED array 106, the light output, which is being emitted by the LED array 106, the electrical energy/the electric power, which is being consumed by the converter stage 105, the electrical energy/the electric power which is being consumed by the LED array 106 etc.

In accordance with the invention, the at least one feedback variable 112 and the at least one feedback variable 113 can be any feedback variable whatsoever, which, by the integrated circuit 103, can be used in order to set by means of the management system and/or the control system of the PFC circuit 105 and/or the at least one converter stage 105 the electrical energy/the electric power which is being supplied to the LED array 106.

The at least one feedback variable 112 and 113 can be measured and/or generated in any manner whatsoever, which is known to the person skilled in the art and be supplied to the integrated circuit 103.

In accordance with the invention, signals, information or commands 114 can be supplied to the integrated circuit 103 also from outside the system 101 (from externally). For example, dimming commands and/or dimming information for the operation of the LED array 106 can be supplied to the integrated circuit 103 from the outside or a set value for the output voltage $V_{BUS}$ of the PFC circuit 104 can be supplied to the integrated circuit 103 from the outside.

The integrated control circuit 103 can likewise provide information on the PFC circuit 104, the at least one converter stage 105 and the LED array 106 to the outside of the system 101. This means that the integrated circuit 103 comprises a bi-directional communication interface by means of which information not only from the outside (outside the system 101) can be communicated to the integrated circuit 103 but can also be communicated from the integrated circuit 103 to the outside. This communication can be made in any manner whatsoever, which is known to the person skilled in the art, such as, for example, in accordance with the DALI standard.

In accordance with the invention, in the system 101, in the PFC module 102, in the integrated circuit 103, in the PFC circuit 104, in the at least one converter stage 105, and in the LED array 106 a memory can be provided in order to store the information, which is being supplied by the PFC circuit 104, by the at least one converter stage 105, by the LED array 106, such as, for example, the feedback variables 107, 109, 110, 112 and 113. Furthermore, also information, which is being supplied to the integrated circuit 103 from outside the system 101, such as, for example, the dimming information for the dimming of the LED array or a set value for the output voltage $V_{BUS}$, can be stored in the memory. Also other information with respect to the management system and/or with respect to the control system of the PFC circuit 104 and the converter stage 105 can be stored, such as, for example, the dimming specifications or parameters which are being determined and/or which are being calculated in the integrated circuit. A parameter of said type can, for example, be the switch-on time ($t_{on}$) of the at least one switch of the PFC circuit 104 or of the at least one switch of the converter stage 105.

The integrated circuit is then capable of not only storing/writing into the memory information for a control and/or for an operation of the PFC circuit 104 and/or of the converter stage 105 but also of downloading/of reading out information from the memory.

The LED array 106 comprises one or more LEDs which can be arranged in parallel and/or in series.

In accordance with the invention, any LED whatsoever, which is known to the person skilled in the art, can be arranged in the LED array 106 in any manner which is known to the person skilled in the art. The light output, which is being emitted from the one or more LEDs of the LED array 106 is depending in a known manner on the LED current and/or on the electrical energy which is being supplied to the LED array 106. As a result, the integrated circuit 103 can set the light output, which is being emitted by the LED array 106, by means of the control of the PFC circuit 104 and/or by means of the at least one converter stage 105.

In accordance with the invention, the integrated circuit 103, which is driving the at least one switch of the actively clocked PFC circuit 104, can also receive feedback variables from the area of the LED array 106, and depending on this can set or control one further converter stage 105 which is clocked or unclocked.

Thus, if the integrated control circuit 103, apart from the PFC circuit 104, is setting or controlling also the at least one converter stage 105, the current state of the at least one converter stage 105 is known, in order that a rapid load adjustment in the area of the PFC circuit 104 can take place. This means that the integrated circuit 103 can use for the control of the PFC circuit 104 the feedback variables 112 and 113 of the converter stage 105 and of the LED array 106.

Figure 2:
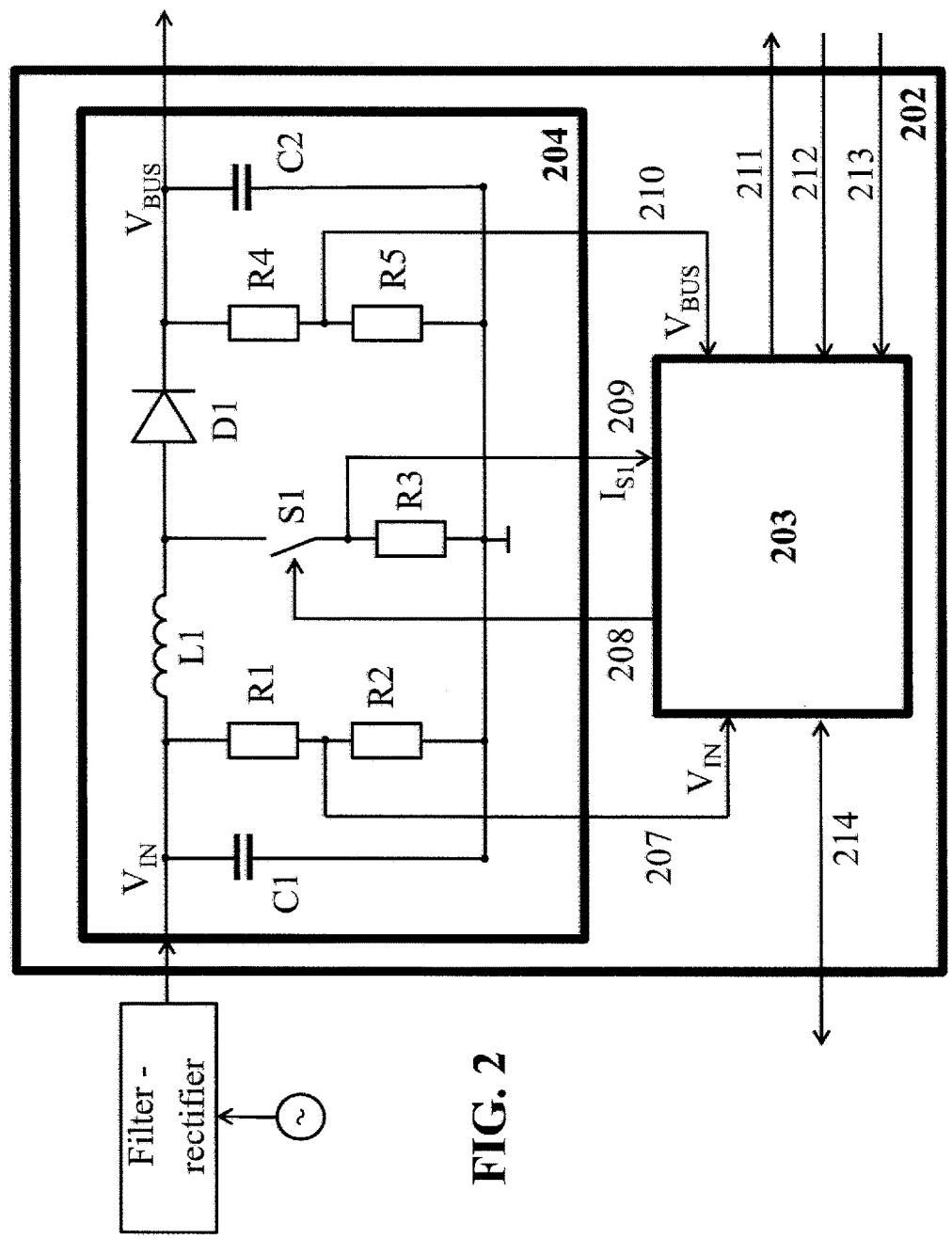
FIG. 2 shows a schematic view of a first preferred embodiment of the PFC module in accordance with the invention.

FIG. 2 shows in a schematic view a first preferred embodiment of the PFC module in accordance with the invention, wherein the statements, which have been made above with respect to the FIG. 1, do also apply to the PFC module 202 of the FIG. 2. As a consequence, in the following, mainly the new aspects of the PFC module 202 in accordance with the invention will be discussed. The last two digits of the reference numerals for the elements of the FIG. 2 correspond to the last two digits of the reference numerals of the corresponding elements of the FIG. 1.

In FIG. 2, the actively clocked PFC circuit 204 corresponds to a boost PFC circuit. But as has already been mentioned above, the PFC circuit 204 in accordance with the invention can be any actively clocked PFC circuit whatsoever which is known to the person skilled in the art.

The coil L1 is charged, when the switch S1 is closed, and it is discharged again, when the switch S1 is opened. Due to the charging and the discharging of the coil L1, in every switching cycle the capacity C2 is charged with electrical energy via the diode D1, and an output voltage $V_{BUS}$ is being set which corresponds to the clocking of the switch S1 by the integrated circuit 203. The switch S1 is preferably a transistor such as, for example, a MOSFET.

In accordance with the FIG. 2, the input voltage $V_{IN}$ of the PFC circuit 204 is measured via a voltage divider, which is consisting of the resistors R1 and R2, and it is supplied to the integrated control circuit 203 as a feedback variable and/or as a signal 207. The current $I_{S1}$, which is flowing through the switch S1 in closed state, is being measured via the resistor and/or via the shunt resistor S3, and is supplied to the integrated circuit 203 as a feedback variable and/or as a signal 209. The output voltage $V_{BUS}$ of the PFC circuit 204 is being measured via a voltage divider, which is consisting of the resistors R4 and R5, and it is supplied to the integrated control circuit 203 as a feedback variable and/or as a signal 210.

As it has already been mentioned above, the feedback variables 207, 209 and 210 can also be measured and/or generated by any manner whatsoever, which is known to the person skilled in the art. This means that the PFC circuit 202 can comprise any device whatsoever, which is known to the person skilled in the art, for the measurement and for the generation of the feedback variables 207, 209 and 210. Furthermore, also still any further feedback variables can be supplied to the integrated circuit 203 by the PFC circuit 204.

In accordance with the invention, the integrated circuit 203 is operating the PFC circuit 204 in discontinuous current mode (DCM) at a fixed operating frequency. For this purpose, the integrated circuit 203 supplies a clock signal 208 to the PFC circuit 204 for clocking of the switch S1. Via the setting of the switch-on time $t_{on}$ of the switch S1, the charge time of the coil L1, that means the time during which the coil L1 is being charged, can be set. Thus, via the setting of the switch-on time $t_{on}$ of the switch S1, the electrical energy transported from the in-put to the output of the PFC circuit 204 can be set.

The switch-on time $t_{on}$ and the switch-off time $t_{OFF}$ of the switch S1 are corresponding together in a known manner to the period T of the clock signal and/or the inverse of the operating frequency f by means of which the switch S1 of the PFC circuit 204 is clocked and/or operated by means of the integrated circuit 203 ($1/f = T = t_{ON} + t_{OFF}$). As, in accordance with the invention, the switch S1 is being operated in discontinuous current mode (DCM) at a fixed operating frequency, the switch-off time $t_{OFF}$ of the switch is being changed, when the switch-on time $t_{on}$ is being changed. During the switch-on time $t_{on}$ of the switch S1 (switch S1 closed/in conductive state) a current is flowing through the coil L1 and the switch S1, wherein the coil L1 is being charged. During the switch-off time $t_{OFF}$ of the switch S1 (switch S1 open/in non-conductive state) a current is flowing from the coil L1 through the diode D1, wherein the coil L1 is being discharged and the capacity C2 is being charged.

It is typical of the discontinuous current mode (DCM) that a dead time $t_{TOT}$ is existing during the switch-off time $t_{OFF}$ during which no current flow is existing through the coil L1, this means that no charge current or discharge current is existing.

The integrated circuit 203 is managing and/or controlling the switch S1 on the basis of the feedback variable 207, which is reproducing the input voltage $V_{IN}$ of the PFC circuit 204, and the feedback variable 210, which is reproducing the output voltage $V_{BUS}$ of the PFC circuit 204 in such a manner in discontinuous current mode (DCM) at a fixed frequency that the current, which is being consumed by the PFC circuit 204, is adjusted to a sinusoidal envelope curve, and a specific output voltage $V_{BUS}$, which is corresponding, for example, to a set value, is being set.

By the setting of the switch-on time $t_{on}$, the integrated control circuit 203 can adjust the current, which is being consumed, to the sinusoidal envelope curve in every switching cycle in order to achieve a power factor of almost 1, and in order to set the output voltage $V_{BUS}$ which is being provided at the output of the PFC circuit 204. Thus, as a result, also the electrical energy can be set which is provided at the output of the PFC circuit 204.

In accordance with FIG. 2, the integrated circuit 203 comprises at least two input pins in order to supply the input voltage $V_{IN}$ and the output voltage $V_{BUS}$ to the integrated control circuit as feedback variables.

But in accordance with the invention, the integrated circuit 203 may also comprise only one input pin in order to supply to the integrated control circuit a feedback variable which is reproducing the input voltage $V_{IN}$ and the output voltage $V_{BUS}$. This is shown in the FIG. 3.

Figure 3:
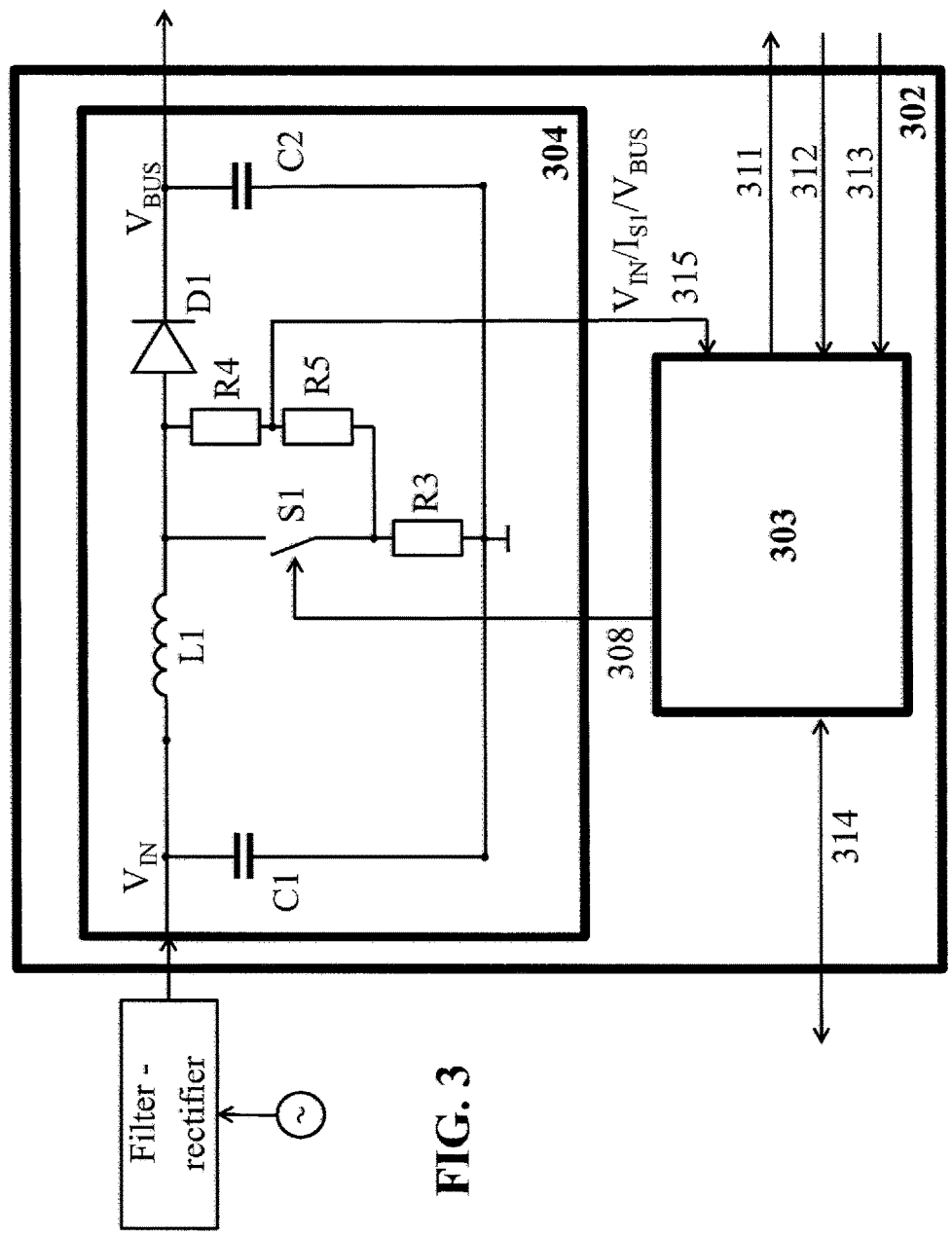
FIG. 3 shows a schematic view of a second preferred embodiment of the PFC module in accordance with the invention.

The statements, which have been made above with respect to the FIGS. 1 and 2 do also apply to the PFC module in accordance with FIG. 3. The last two digits of the reference numerals for the elements of the FIG. 3 correspond to the last two digits of the reference numerals of the corresponding elements of the FIGS. 1 and 2.

The PFC module 302 in accordance with FIG. 3 is differing from the PFC module 202 in accordance with FIG. 2 by the fact that the input voltage $V_{IN}$, the current $I_{S1}$, which is flowing through the circuit S1 in the closed condition, as well as the output voltage $V_{BUS}$ are being supplied to the integrated circuit 303 by the PFC circuit 304 by means of an individual feedback variable and/or a signal 315.

For this purpose, the voltage divider, which is consisting of the resistors R4 and R5, is arranged in parallel to the switch S1 upstream of the diode D1. The voltage divider, which is consisting of the resistors R1 and R2, for the detection of the input voltage $V_{IN}$ in accordance with the FIG. 2 is now no longer needed. This is advantageous since component elements can be saved as a result.

In accordance with the invention, the input voltage $V_{IN}$ and the output voltage $V_{BUS}$ can be detested in any manner whatsoever, which is known to the person skilled in the art, in such a way that an individual feedback variable 315, which reproduces these two voltages, is being supplied to the integrated circuit 303 by the PFC circuit 304. This means that at a point in time during a switching cycle of the switch S1, the feedback variable 115 is reproducing the input voltage $V_{IN}$, and that at a different point in time during the switching cycle of the switch S1, the feedback variable 115 is reproducing the output voltage $V_{BUS}$.

Figure 4:
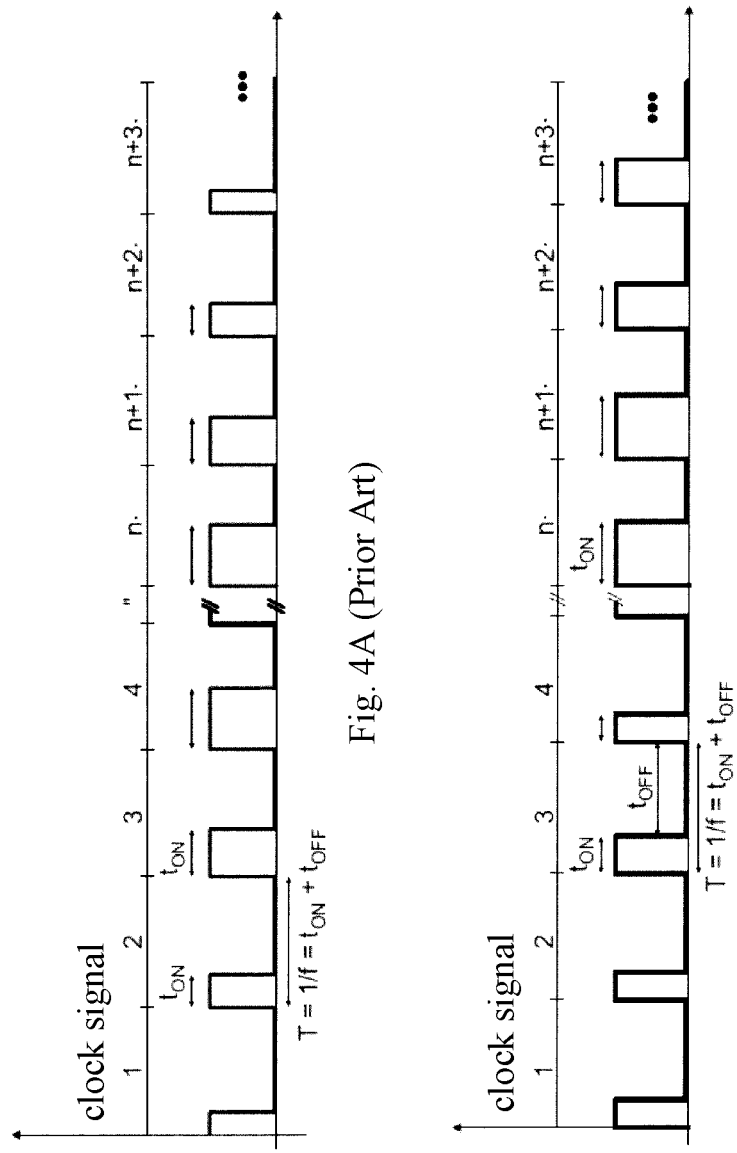
FIG. 4A shows a clock signal (upper graph) for the control of a switch of a PFC circuit in discontinuous current mode (DCM) at a fixed frequency in accordance with the State of the Art and FIG. 4B shows a schematic view of the clock signal (lower graph) generated by the integrated control circuit of the PFC module in accordance with the invention for the control and/or for the clocking of the at least one switch of the PFC circuit of the PFC module in accordance with the invention in discontinuous current mode (DCM) at a fixed frequency.

FIG. 4 shows in a schematic view the clock signal (lower graph), which is being generated by the integrated control circuit of the PFC module in accordance with the invention for the control and/or for the clocking of the at least one switch of the PFC circuit of the PFC module in accordance with the invention in discontinuous current mode (DCM) at a fixed frequency as well as a clock signal (upper graph) for the control of a switch of a PFC circuit in the discontinuous current mode (DCM) at a fixed frequency in accordance with the State of the Art.

In accordance with the State of the Art, in every switching cycle of the at least one switch S1 of the PFC circuit, the switch-on time $t_{on}$ is calculated depending on the current state of the input voltage $V_{IN}$ in order to adjust the current, which is being consumed by the PFC circuit, to the current amplitude of the sinusoidal input voltage $V_{IN}$. This means that the switch-on time $t_{on}$ is being calculated on a "cycle-by-cycle" basis.

In accordance with the invention, the integrated control circuit is also calculating and/or determining the switch-on time $t_{on}$ dependent on the amplitude of the input voltage $V_{IN}$, wherein the integrated control circuit, however, keeps constant the switch-on time $t_{on}$ for at least two consecutive switching cycles within a half-wave of the input voltage $V_{IN}$. This means that in accordance with the invention, the integrated circuit is setting the switch-on time $t_{on}$ only for every second switching cycle within a halve-wave of the input voltage $V_{IN}$.

In accordance with the invention, the switch-on time $t_{on}$ can also be kept constant for more than 2 consecutive switching cycles, preferably 15 switching cycles maximum, more preferred 10 switching cycles maximum within a half-wave of the input voltage $V_{IN}$ in order that a still sufficiently good power factor can be guaranteed.

Therefore, the control of the switch-on time $t_{on}$ by the integrated circuit/control circuit for the adjustment to the current amplitude of the half-wave of the input voltage $V_{IN}$ does not occur at each switching cycle but only at each n-th switching cycle, wherein n may be greater than or equal to 2 ($n \geq 2$) and preferably is not greater than 15 ($n < 15$). Thus, at least two or more switching cycles and/or switch-on cycles take place comprising "disks", wherein during said disks the switch-on time $t_{on}$ of the PFC switch S1 is not changed. Hence, packages of switching cycles and/or switch-on cycles with constant switch-on time $t_{on}$ are being created, this means that, in accordance with the invention, the integrated circuit is setting the switch-on time $t_{on}$ within a half-wave of the input voltage $V_{IN}$ not "cycle-by-cycle" but package-by-package.

This difference in the setting of the switch-on time $t_{on}$ within a half-wave of the input voltage $V_{IN}$ can be seen in the FIG. 4. The upper graph shows the State of the Art: at each clock signal, that means, at each switching cycle within a half-wave of the input voltage $V_{IN}$, the switch-on time $t_{on}$ is being set and/or being adjusted to the current amplitude of the input voltage $V_{IN}$. The bigger the amplitude of the input voltage $V_{IN}$ is, the larger the switch-on time $t_{on}$ is being set. This means that within a half-wave of the input voltage the switch-on time $t_{on}$ is at first increased at each switch-on cycle until the maximum amplitude of the half-wave of the input voltage has been reached. Subsequently, the switch-on time $t_{on}$ is decreased again at each switching cycle.

The lower graph of the FIG. 4 shows the setting of the switch-on time $t_{on}$ in accordance with the invention by the integrated control circuit: at each second switching cycle and/or clock cycle ($1^{st}$, $3^{rd}$, $n^{th}$ and $n+2^{nd}$ switching cycle) within a half-wave of the input voltage $V_{IN}$ the switch-on time $t_{on}$ is being set dependent on the amplitude of the input voltage $V_{IN}$. This means that the switch-on time $t_{on}$, in accordance with the invention, is kept constant for at least two consecutive clock cycles (for example $1^{st}$ and $2^{nd}$, $3^{rd}$ and $4^{th}$, $n^{th}$ and $n+1^{st}$ etc.).

As it has already been mentioned above, in accordance with the invention, the switch-on time $t_{on}$ can be set by the integrated circuit at each n-th switching cycle and/or can be kept constant for n consecutive switching cycles/clock cycles, wherein n can be greater than or equal to 2 ($n \geq 2$) and preferably is not greater than 15 ($n < 15$).

Furthermore, in accordance with the invention, the integrated circuit can set the switch-on time $t_{on}$ of the switch S1 of the PFC circuit also dependent on the output voltage $V_{BUS}$ of the PFC circuit in order that the actual value of the output voltage $V_{BUS}$ corresponds to a set value.

It is the advantage of the setting of the switch-on time $t_{on}$ in accordance with the invention that as an integrated circuit for the operation of the PFC circuit a microcontroller, preferably a cost-effective, simple microcontroller, can be used.

Figure 5:
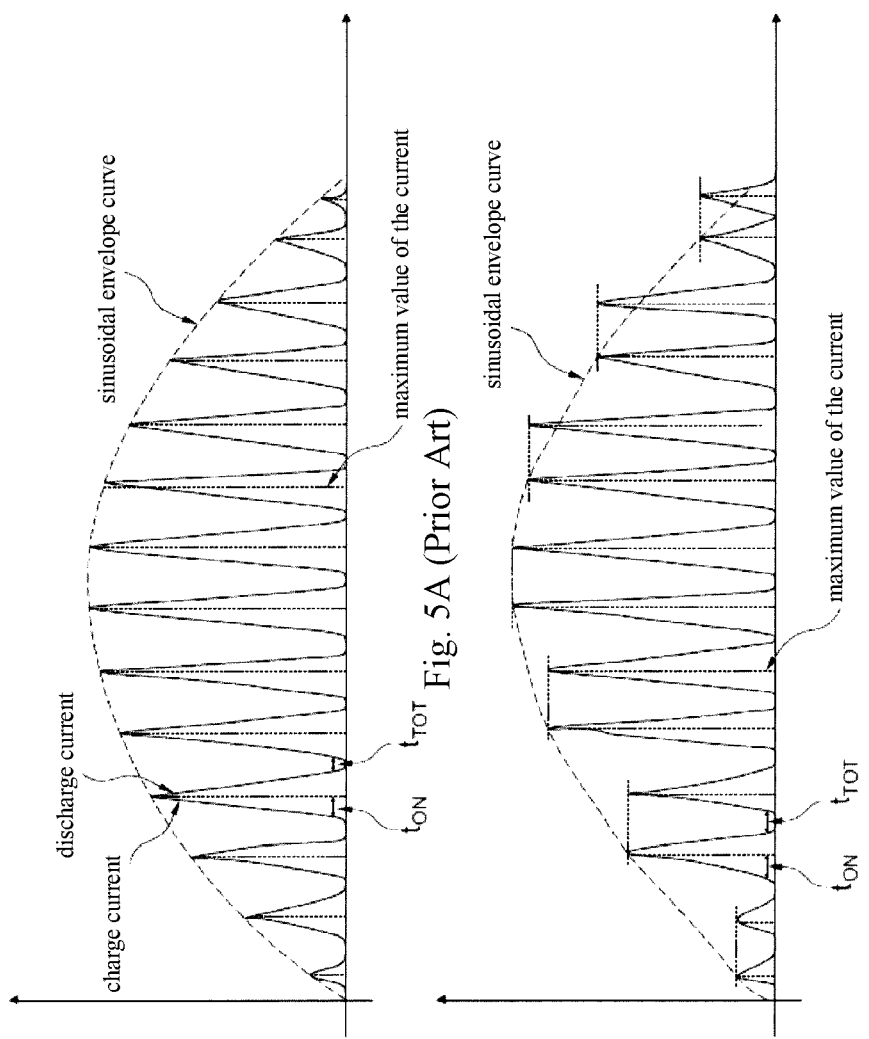
FIG. 5B shows a schematic view of the adjustment of the current, which is consumed by the PFC circuit of the PFC module in accordance with the invention, to a sinusoidal envelope curve when the PFC circuit is being operated in discontinuous current mode (DCM) at a fixed frequency in accordance with the invention (lower graph) as compared to FIG. 5A which shows a schematic view in accordance with the State of the Art (upper graph).

FIG. 5 shows in a schematic view the adjustment of the current consumed by the PFC circuit of the PFC module in accordance with the invention to a sinusoidal envelope curve and/or to a half-wave of a sinusoidal envelope curve when the PFC circuit is being operated in discontinuous current mode (DCM) at a fixed frequency in accordance with the invention (lower graph) and/or in accordance with the State of the Art (upper graph). The upper graph of the FIG. 5 is showing the adjustment of the current consumed by the PFC circuit to a sinusoidal envelope curve at clocking of the switch S1 of the PFC circuit with a clock signal in accordance with the upper graph of the FIG. 4.

In analogy, the lower graph is showing the adjustment of the current consumed by the PFC circuit to a sinusoidal envelope curve at clocking of the switch S1 of the PFC circuit with a clock signal in accordance with the lower graph of the FIG. 4.

In the two graphs of the FIG. 5 the relation between the sinusoidal envelope curve and the current through the coil L1 and/or the coil current of the PFC circuit is shown, wherein the rising edges of the triangular signal and/or the triangular wave forms are corresponding to the charge current through the coil L1 and in analogy the falling edges are corresponding to the discharge current through the coil. L1. The two figures are showing only in a schematic view the adjustment of the current consumed by the PFC circuit and/or of the coil current to the sinusoidal envelope curve, since the at least on switch S1 of the PFC circuit is being operated with a far greater operating frequency than the frequency of the input voltage $V_{IN}$ of the PFC circuit and/or the sinusoidal envelope curve so that that in reality within a half-wave of the sinusoidal envelope curve a far greater number of triangular wave forms is existing than it is shown in the FIG. 5.

Furthermore, one can see in the two graphs of FIG. 5A and 5B that in each switching cycle a time and/or a dead time $t_{TOT}$ is existing during which no current is flowing through the coil of the PFC circuit. This is typical of an operation of the PFC circuit in discontinuous current mode (DCM).

In the upper graph one can see that as a result of the adjustment of the switch-on time $t_{on}$ of the switch S1 of the PFC circuit to the amplitude of the input voltage $V_{IN}$ at each switching cycle and/or clock cycle, the maximum value of the current in each switching cycle is adjusted to the half-wave of the sinusoidal envelope curve.

In the lower graph one can see that as a result of the adjustment in accordance with the invention of the switch-on time $t_{on}$ of the switch S1 of the PFC circuit to the amplitude of the input voltage $V_{IN}$ at each second switching cycle, the maximum value of the current is adjusted to the halfwave of the sinusoidal envelope curve only in every second switching cycle. This means that there are switching cycles in which the maximum value of the current is smaller than the envelope curve and that there are switching cycles in which the maximum value of the current is greater than the envelope curve.

In accordance with the invention, as it has already been mentioned above, the switch-on time $t_{on}$ can be set at each n-th switching cycle and/or it can be kept constant for n consecutive clock cycles, wherein n can be greater than or equal to 2 (n≥2) and preferably is not greater than 15 (n<15).

This means that in the lower graph in accordance with the invention n consecutive switching cycles and/or n consecutive triangular wave forms can comprise almost the same maximum current.

As a result of the changing input voltage $V_{IN}$, the maximum current and/or peak current will change nevertheless, when the switch-on time $t_{on}$ is being set only at each n-th switching cycle and/or it is kept constant for n consecutive clock cycles.

But the maximum current and/or peak current is generally influenced by the adjustment of the switch-on time $t_{on}$, that means, when the switch-on time $t_{on}$ of the switch S1 of the PFC circuit in a switching cycle, for example, in each n-th switching cycle, is adjusted to the amplitude of the input voltage $V_{IN}$, then the maximum value of the current and/or of the peak current in said switching cycle is being adjusted to the half-wave of sinusoidal envelope curve. As a result, the maximum value of the current and/or of the peak current in a switching cycle is generally being determined by the switch-on time $t_{on}$ of the switch in said switching cycle, wherein a change of the input voltage $V_{IN}$ has also a certain influence on the peak current.

Therefore, the peak current will change nevertheless during the n consecutive switching cycles and/or the n consecutive triangular wave forms as a result of the changing input voltage $V_{IN}$ (but influenced by the adjustment of the switch-on time $t_{on}$), when the switch-on time $t_{on}$ is being set only at each n-th switching cycle and/or it is kept constant for n consecutive clock cycles.

Thus, in accordance with the invention, n consecutive switching cycles and/or n consecutive triangular wave forms can comprise an almost identical maximum current and/or peaks.

Thus, during the n consecutive switching cycles, the maximum current and/or peak current will change nevertheless as a result of the changing input voltage $V_{IN}$, wherein the peak current is generally influenced and/or set by the adjustment of the switch-on time $t_{on}$ of the switch of the PFC circuit.

Although, at a constant switch-on time $t_{on}$ during n consecutive switching cycles the current for n−1 switching cycles does not correspond exactly to the sinusoidal envelope curve, a sufficiently good power factor can be achieved.

Figure 6:
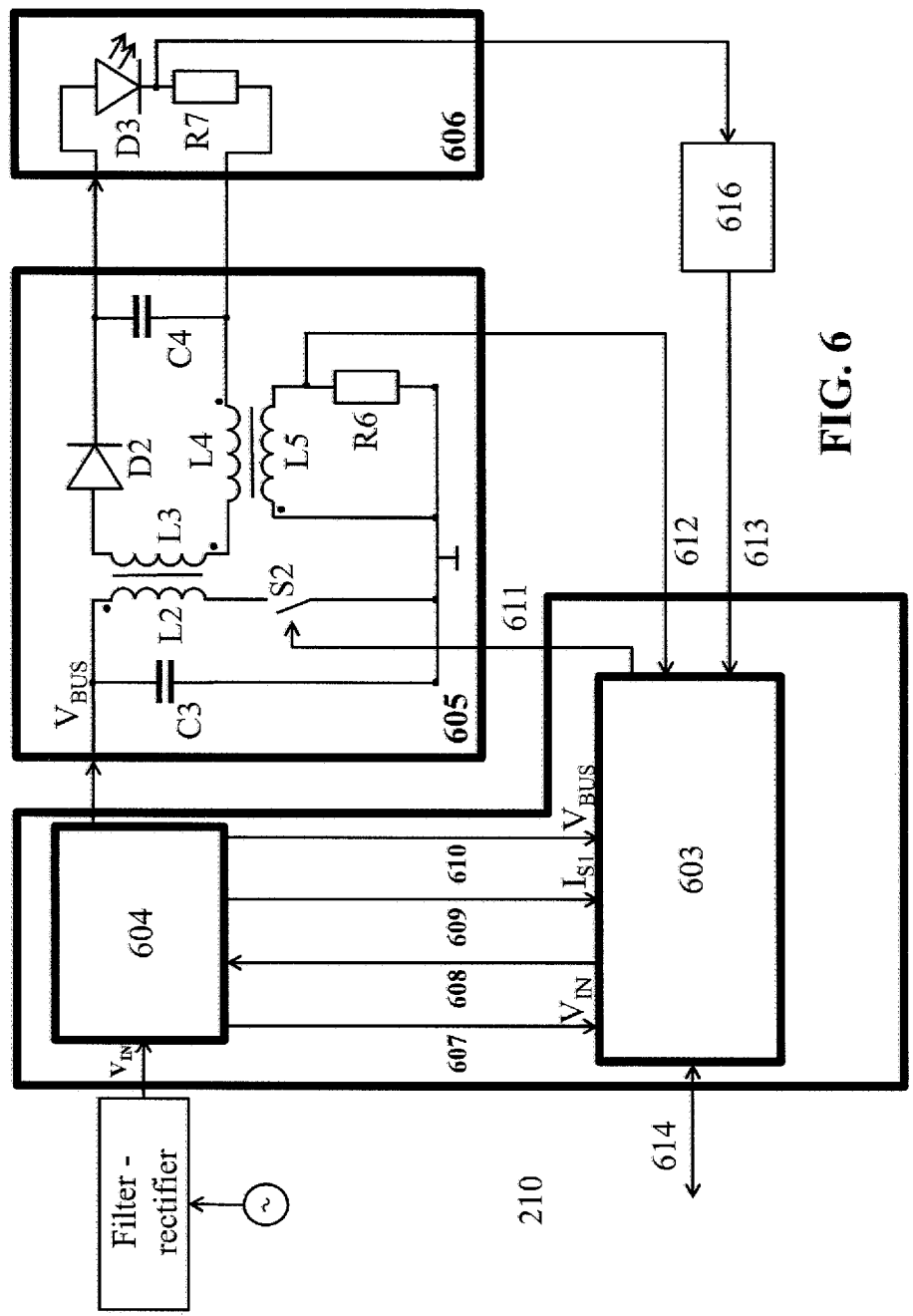
FIG. 6 shows a schematic view of a preferred embodiment of the at least one converter stage of the system in accordance with the invention.

FIG. 6 shows in a schematic view a preferred embodiment of the at least one converter stage of the system in accordance with the invention, wherein the above mentioned statements with respect to the FIGS. 1 to 5 do also apply to the system as well as to the converter stage 605 of the FIG. 6. As a result, in the following, mainly new aspects with respect to the system in accordance with the invention and the converter stage 605 will be discussed. The last two digits of the reference numerals for the elements of the FIG. 6 correspond to the last two digits of the reference numerals of the corresponding elements of the FIGS. 1 to 3.

In FIG. 6 the converter stage 605 corresponds to a flyback converter. As it has already been mentioned above, in accordance with the invention, however, the converter stage 605 can be any clocked or unclocked converter stage whatsoever, which is known to the person skilled in the art, and which is capable of providing an LED current and/or electrical energy for the operation of the LED array 606 such as, for example, primarily or secondarily clocked converters or linear current sources.

In accordance with the invention, the integrated circuit/control circuit 603, which is operating the PFC circuit 604, is controlling and/or is operating also the converter stage 605. In accordance with FIG. 6, the integrated circuit 603 is supplying a signal and/or a clock signal 611 to the switch S2 of the converter stage 605. The switch S2 is preferably a transistor such as, for example, a MOSFET.

By setting of the switch-on time $t_{on}$ of the switch S2, that means the time period for which the switch S2 is conductively switched, the integrated circuit 603 can set the power consumption of the converter stage 605 and thus the LED current $I_{LED}$ and/or the electrical energy which is provided to the LED array 606. But as an alternative, the integrated circuit 603 can also, instead of the switch-on time $t_{on}$ of the switch S2, set its duty cycle, that means the relationship between the period T of the clock signal 611 and the switch-on time $t_{on}$ and/or the operating frequency of the same.

In accordance with the invention, the signal and/or the clock signal 611 can be determined and/or calculated by the integrated circuit 603 on the basis of at least one feedback variable 612 from the converter stage 605 and/or at least one feedback variable 613 from the LED array 606.

In accordance with FIG. 6, the LED current is being measured by means of a measuring transformer with the primary coil L4 and the secondary coil L5 and the resistor R6, and said LED current is supplied to the integrated circuit 603 as a feedback variable and/or as a signal 612 from the converter stage 605. Moreover, the LED current is measured via the resistor R7, preferably a shunt resistor, and said LED current is supplied to the integrated circuit 603 as a feedback variable and/or signal 613 from the LED array 606. Optionally, an optical coupler or any other galvanically separating element 616 whatsoever, which is known to the person skilled in the art, can be used for the feedback of the feedback variable 613 from the LED array 606 to the integrated circuit 603.

As it has already been mentioned above, in accordance with the invention, various physical variables and/or parameters can be detected in the converter stage 605 and in the LED array 606 and can be supplied to the integrated circuit 603 in any manner whatsoever, which is known to the person skilled in the art, as feedback variables for a determination and/or a calculation of the clock signal 611. For this purpose, the converter stage 605 and the LED array 606 can comprise any element whatsoever, which is known to the person skilled in the art, for the detection of physical variables and/or parameters. For example, the LED array can comprise a device and/or a sensor for the detection of the light output, which is being emitted by the one or more LEDs of the LED array 606, wherein the sensor is detecting the light output and a feedback variable and/or signal 613 reproducing the light output is being supplied to the integrated circuit 603.

Furthermore, in accordance with the invention, the feedback variables 612 and 613 can be used by means of the integrated circuit 603 for the control and/or for the operation of the PFC circuit 604. As a result, the operation of the PFC circuit can be adjusted to changing load conditions such as, for example, a dimming of the LED array. As a consequence, the electric power/electrical energy consumed by the PFC circuit and the output voltage $V_{BUS}$ or electrical energy provided by the PFC circuit at the output can be adjusted to changed load conditions. Changed load conditions can be any conditions whatsoever, which are known to the person skilled in the art, such as, for example, a dimming of the one or more LEDs of the LED array 606, an emergency light mode of the LED array 606, a changed consumption of electrical energy and/or power by the LED array 606 etc.

As it has already been mentioned above, the integrated circuit 603 is operating the PFC circuit 604 in discontinuous current mode (DCM) at a fixed operating frequency at unchanged input voltage conditions and load conditions.

In accordance with the invention, the integrated circuit 603 can now change the operating frequency of the PFC circuit 604 preferably with a frequency below the frequency of a half-wave of the input voltage $V_{IN}$ of the PFC circuit 604 as an adjustment to changed input voltage conditions and/or load conditions.

Furthermore, in accordance with the invention, the integrated circuit 603 can control the actively clocked PFC circuit 604, preferably the operating frequency of the PFC circuit 604, as well as the converter stage 605 dependent on the input voltage $V_{IN}$ of the PFC circuit 604, the at least one feedback variable 612 from the converter stage 605 and/or the at least one feedback variable 613 from the LED array 606.

Moreover, in accordance with the invention, the integrated circuit 603 can control and/or set the output voltage $V_{BUS}$ of the PFC circuit 604 dependent on the input voltage $V_{IN}$ of the PFC circuit 604, the at least one feedback variable 612 from the converter stage 605 and/or the at least one feedback variable 613 from the LED array 606.

Hence, in accordance with the invention, the integrated control circuit 603 of the PFC module 602 can manage and/or control from the outside the at least one switch S1 of the PFC circuit 604 in discontinuous current mode (DCM) at a fixed operating frequency and the at least one switch S2 of the converter stage 605 on the basis of the feedback variables 607, 609, 610, 612 and 613 from the PFC circuit 604, the converter stage 605 and the LED array 606 as well as information 614.

The fixed operating frequency of the PFC circuit can be changed by the integrated circuit 603, preferably with a frequency below the frequency of a half-wave of the input voltage $V_{IN}$ of the PFC circuit 604, as an adjustment to changed input voltage conditions and/or load conditions, that means dependent on the input voltage $V_{IN}$ of the PFC circuit 604, the at least one feedback variable 612 from the converter stage 605 and/or the at least one feedback variable 613 from the LED array 613.

The invention claimed is:

1. A PFC module (102) comprising
an actively clocked PFC circuit (104) comprising at least one controlled switch (S1), and
an integrated circuit (103) as a control unit which controls during a half-wave of an input voltage ($V_{IN}$) of the actively clocked PFC circuit (104) the at least one switch (S1) of the actively clocked PFC circuit (104) with a fixed operating frequency in discontinuous current mode (DCM), wherein the integrated circuit (103) sets the switch-on time ($t_{on}$) of the at least one switch (S1) dependent on an amplitude of the input voltage ($V_{IN}$) of the actively clocked PFC circuit (104), and keeps constant the switch-on time ($t_{on}$) for at least two consecutive switching cycles within the half-wave of the input voltage ($V_{IN}$).

2. The PFC module according to claim 1, wherein the integrated circuit sets the switch-on time ($t_{on}$) of the at least one controlled switch dependent on an output voltage of the actively clocked PFC circuit in order that an actual value of the output voltage of the PFC circuit corresponds to a set value.

3. The PFC module according to claim 1,
wherein the integrated circuit comprises at least one input pin, and
wherein the integrated circuit detects via the at least one input pin the input voltage and the output voltage of the PFC circuit.

4. The PFC module according to claim 1,
wherein the integrated circuit comprises at least two input pins, and
wherein the integrated circuit via the first of the at least two input pins detects the input voltage of the PFC circuit, and via the second of the at least two input pins detects the output voltage of the PFC circuit.

5. The PFC module according to claim 1,
wherein it is possible to connect directly or indirectly a load circuit comprising an LED array with one or more LEDs to the actively clocked PFC circuit, and
wherein the integrated circuit is adapted in order to control the actively clocked PFC circuit on the basis of at least one feedback variable from the load circuit.

6. The PFC module according to claim 1,
wherein the integrated circuit is adapted in order to modify the operating frequency of the PFC circuit with a frequency below the frequency of a half-wave of the input voltage of the PFC circuit as an adjustment to changed input voltage conditions and/or to changed load conditions.

7. The PFC module according to claim 1,
wherein the input voltage of the actively clocked PFC circuit is a rectified a.c. voltage.

8. A lighting device comprising:
the PFC module (102) according to claim 1,
an LED array (106) comprising at least one LED,
wherein the PFC module (102) is adapted in order to operate the LED array (106).

9. The PFC module according to claim 1, wherein the integrated circuit (103) is a microcontroller.

10. A system (101) comprising
a PFC module (102), wherein the PFC module (102) comprises an integrated circuit (103) and an actively clocked PFC circuit (104) with at least one first switch (S1), and
at least one converter stage (105) with at least a second switch (S2) for the operation of an LED array (106) with one or more LEDs,
wherein the at least one converter stage (105) is connected directly or indirectly to the actively clocked PFC circuit (104),
wherein the integrated circuit (103) controls during a half-wave of an input voltage ($V_{IN}$) of the actively clocked PFC circuit (104) the at least one first switch (S1) of the actively clocked PFC circuit (104) with a fixed operating frequency in discontinuous current mode (DCM),
wherein the integrated circuit controls the actively clocked PFC circuit (104) and the at least one converter stage (105) dependent on input voltage conditions and/or load conditions of the LED array,
wherein the integrated circuit (103) controls the at least one second switch (S2) of the at least one converter stage (105) for setting light output emitted by the LED array (106), and
wherein the integrated circuit (103) sets the switch-on time ($t_{on}$) of the at least one switch (S1) dependent on an amplitude of the input voltage ($V_{IN}$) of the actively clocked PFC circuit (104), and keeps constant the switch-on time ($t_{on}$) for at least two consecutive switching cycles within the half-wave of the input voltage ($V_{IN}$).

11. The system according to claim 10, wherein the integrated circuit controls groups of clocked electrical components and/or groups of unclocked electrical components of the at least one converter stage.

12. The system according to claim 11, wherein the at least one converter stage constitutes a clocked current source for the operation of the LED array or an unclocked current source for the operation of the LED array.

13. The system according to claim 10, wherein the integrated circuit detects at least a first feedback variable from the at least one converter stage and/or at least a second feedback variable from the LED array which is operated by the at least one converter stage.

14. The system according to claim 13,
wherein the integrated circuit controls the actively clocked PFC circuit and the at least one converter stage dependent on an input voltage of the actively clocked PFC circuit, the at least one first feedback variable and/or the at least one second feedback variable.

15. The system according to claim 14, wherein the integrated circuit controls the operating frequency of the actively clocked PFC circuit.

16. The system according to claim 13,
wherein an output voltage of the actively clocked PFC circuit corresponds to an input voltage of the at least one converter stage, and
wherein the integrated circuit controls the output voltage of the actively clocked PFC circuit dependent on the input voltage of the actively clocked PFC circuit, the at least one first feedback variable and/or the at least one second feedback variable.

17. The system according to claim 13,
wherein the integrated circuit changes the operating frequency of the PFC circuit with a frequency below the frequency of a half-wave of the input voltage of the actively clocked PFC circuit dependent on the input voltage of the actively clocked PFC circuit, the at least one first feedback variable and/or the at least one second feedback variable.

18. A lighting device comprising:
the system (101) according to claim 10,
an LED array (106) comprising at least one LED,
wherein the system (101) is adapted in order to operate the LED array (106).

19. A method for the operation of a PFC module (102), wherein the PFC module (102) comprises an integrated circuit (103) as a control unit and an actively clocked PFC circuit (104) comprising at least one controlled switch (S1),
wherein the method comprises the following method steps:
controlling with the integrated circuit (103) the at least one switch (S1) of the actively clocked PFC circuit (104) with a fixed operating frequency in discontinuous current mode (DCM) during a half-wave of an input voltage of ($V_{IN}$) of the actively clocked PFC circuit (104),
setting with the integrated circuit (103) the switch-on time ($t_{on}$) of the at least one switch (S1) dependent on an amplitude of the input voltage ($V_{IN}$) of the actively clocked PFC circuit (104), and keeping constant the switch-on time ($t_{on}$) for at least two consecutive switching cycles within the half-wave of the input voltage ($V_{IN}$).

20. A method for the operation of a system (101) comprising a PFC module (102), wherein the PFC module (102) comprises an integrated circuit (103) and an actively clocked PFC circuit (104) with at least one first switch (S1), and at least one converter stage (105) with at least a second switch (S2) for the operation of an LED array (106) with one or more LEDs,
wherein the at least one converter stage (105) is connected directly or indirectly to the actively switched PFC circuit (104),
wherein the method comprises the following method steps:
controlling with the integrated circuit (103) the at least one first switch (S1) of the actively clocked PFC circuit (104) with a fixed operating frequency in discontinuous current mode (DCM) during a half-wave of the input voltage ($V_{IN}$) of the actively clocked PFC circuit 104), controlling with the integrated circuit (103) the actively clocked PFC circuit (104) and the at least one converter stage (105) dependent on input voltage conditions and/or on the load conditions of the LED array, controlling with the integrated circuit (103) the at least one second switch (S2) of the at least one converter stage (105) for the setting of light output emitted by the LED array (106), and setting with the integrated circuit (103) the switch-on time ($t_{on}$) of the at least one switch (S1) dependent on the amplitude of the input voltage ($V_{IN}$) of the actively clocked PFC circuit (104), and keeping constant the switch-on time ($t_{on}$) for at least two consecutive switching cycles within the half-wave of the input voltage ($V_{IN}$).

\* \* \* \* \*